Feb. 13, 1962   J. R. MOSS ETAL   3,021,121
FEED MIXER
Filed Sept. 16, 1960
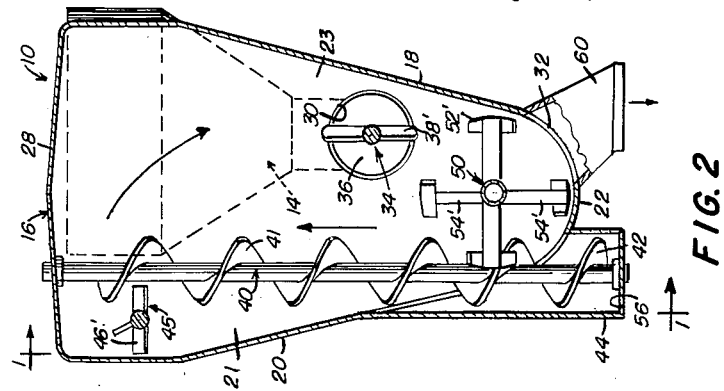
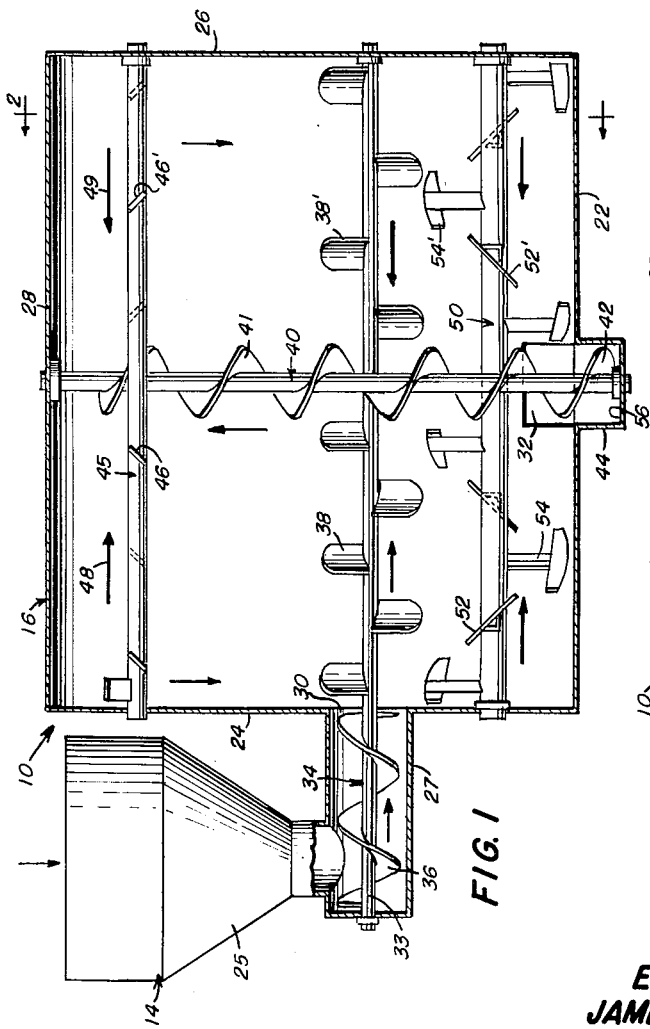
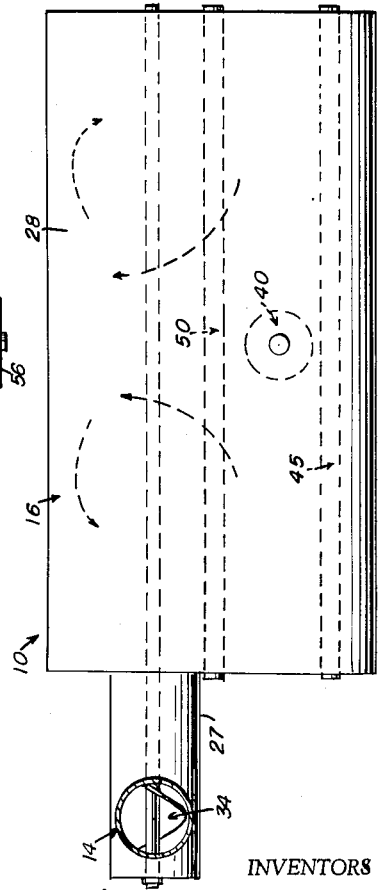
INVENTORS
JAMES R. MOSS
EDWARD T. KOCH, JR.
JAMES E. STEVENS, JR.
BY
ATTORNEYS

United States Patent Office 3,021,121
Patented Feb. 13, 1962

3,021,121
FEED MIXER
James R. Moss, Springfield, Edward T. Koch, Jr., Goodlettsville, and James E. Stevens, Jr., Nashville, Tenn., assignors to Seco, Inc.
Filed Sept. 16, 1960, Ser. No. 56,421
4 Claims. (Cl. 259—97)

This invention relates to a feed mixer and specifically to a feed mixer of a type which obtains better mixing through a unique material flow. Although the mixer has specific advantages when used with mobile power driven units, it will be apparent that it does have stationary adaptations.

It has become common practice in recent years for farmers having farms sufficiently large to raise their own feed supplies, to mix their feeds in their own automotive mills. The proper nutrients, molasses, and the like are added to the mixer as recommended by the suppliers thereof. This invention provides therefor a feed mixer for farm automotive mills which will receive both wet and dry materials and which will result in a complete mix without bridging, dead spots, or fluffing of the feed.

A further objective of this invention is to provide a feed mill which performs its mixing operation while continuously grinding and mixing the materials received.

A further objective of this invention is to provide a mixer which has a system of conveyors which will continuously move the mass of feed being mixed in a circuitous path which includes a substantial section of the feed mixer housing which does not have a conveyor therein. Specifically this provision includes three horizontal conveyors which continuously urge the feed toward the central part of the hopper where the feed is moved in an upwardly direction by a vertical conveyor and then, through its own momentum and lack of space in which to travel, will urge itself frontwardly into a portion of the housing which does not include a conveyor.

A still further objective of this invention is to provide a horizontal feed conveyor which is spaced approximately midway of the vertical length of the mixer housing and a bottom conveyor spaced therebeneath which has a system of paddles spaced along its length to constantly scrape any feed which may cling to the bottom of the housing.

Machines for mixing dry feeds and moist feeds are well known in the art. Machines of this character have been heretofore devised but normally include in their operation a major mixing and feeding means near the bottom or the top of the feed mill. This invention has as one of its further objectives, a central feed mill with horizontal conveyors spaced on either side of a vertical conveyor. Near the top of the vertical conveyor the materials are forced together and downwardly to provide a mixing of a type heretofore not attained. In the circulation of the ingredients of the instant invention, the same are moved from a central midpoint upwardly and outwardly and are forced downwardly through their own gravitational characteristic. As the feed reaches a lower portion of the feed mill, horizontal conveyors again urge it toward a central vertical conveyor. Apparently this forcing together of the mix at one undisturbed spot causes the superior mix and results in an absence of fluffing, bridging and dead spots.

A still further objective of this invention is to provide a mixer of a type whereby the interior parts are accessible and easily reached for cleaning, and will have a non-clogging tendency even though ingredients having a high viscosity are used.

These and other objectives will become apparent from the following description of the accompanying drawings wherein:

FIG. 1 is a cross-sectional view taken along the line 1—1 of FIG. 2;
FIG. 2 is a side elevational view with portions of the hopper broken away such that the interior of the hopper may be observed; and
FIG. 3 is a top plan view of the invention.

Accordingly, the invention is comprised of a mixer or mill 10 which is adapted to be conveniently mounted on an automotive vehicle and is comprised basically of a feed inlet 14 and a mixer housing 16. The mixer housing 16 is comprised of a front tapered wall 18, a rear wall 20 and a rounded bottom 22 adapted to connect the tapered walls 18 and 20 at their bottom-most edges. The hopper is completed by vertical side walls 24 and 26 and the cover member 28.

For lack of a better term, that portion of the hopper nearest the side wall 20 will be referred to as the rear portion 21 and that nearest the side wall 18 as the front portion 23.

There are two major openings to the hopper; one is opening 30 which is spaced near center depth of the hopper 16, and the other is the opening 32 which is spaced along the bottom of the rounded bottom 22. The opening 32 is the dispensing outlet from the hopper and its opening or closing can be performed by a manual slide door or by any conventional manner, and its operation is not within the scope of this invention.

The feed inlet 14 is comprised of a funnel 25 and the conveyor enclosure 27. All of the feed to be mixed is placed in the funnel 25 and it is transferred to the housing 16 through enclosure 27 by end 33 of conveyor 34.

The conveyor 34 extends through opening 30 into housing 16. Note that the section 33 of this conveyor is of a screw type until it reaches the interior of hopper 16. At that point, a series of paddles 38 and 38' are spaced along the conveyor shaft.

A vertical screw conveyor 40 extends through the rounded bottom 22 and upwardly to cover 28. The screw conveyor 40 has an extension 42 which is received by an extension chamber 44. The central vertical screw conveyor 40 is so constructed that it will constantly feed all of the feed material upwardly. The extension 44 provides a journaling surface 56 for conveyor 40. It is also dimensioned such that any material falling into the extension 44 will be removed by the lower portion of the screw thread 41. It should be noted here that the vertical conveyor 40 is in the rear portion of the hopper and the horizontal feed conveyor 34 is spaced well forward into the previously mentioned forward portion 23 of the hopper 21.

Spaced near the upper end of screw conveyor 40 is a second horizontal conveyor 44 which is positioned to the rear of the vertical conveyor 40 in rear portion 21. A series of blades 46 and 46', respectively on opposite sides of center of the hopper, are arranged so that material coming in contact therewith will be fed inwardly and centrally of the hopper toward the vertical conveyor as denoted by arrows 48 and 49.

The mixing apparatus is completed by a bottom conveyor 50. Paddles 52 and 52' spaced along the conveyor are twisted in a manner to feed toward vertical conveyor 40. The paddles 52 and 52' are supported respectively by arms 54 and 54' which are sufficiently long to insure that all material will be scraped from the bottom of the mixer housing 16.

The conveyors 34, 40, 44, and 50 are journaled at their respective ends in any conventional manner. Further, the speed and motive power to turn the separate conveyors may be accomplished by transfer means such as belts or chain drives or the like which are adapted to be connected to the main power shaft of the motor vehicle. The transfer of power to the conveyors is well within the domain of those skilled in the art.

The mixing operation does not reach its most effective operation until the level of feed reaches a point above the conveyor 44. The improved mixing accomplished and the cooperation of the structural elements can be better understood upon a description of the feed flow during an operation cycle of the mill.

Assuming that the hopper has been filled, and all conveyors are rotating, the feed near the lower end of conveyor 40 will be forced in an upwardly direction by screw threads 41. Since the paddles 52, 52', 38 and 38' all force feed toward the vertical conveyor 40, the feed urged upwardly is continuously being replaced.

Through the action of blades 46 and 46', the feed, as it approaches the upper end of conveyor 40, is still being urged from both directions to the lateral midpoint of the hopper. The feed at this point has no place to go and must go forward to the front portion of the hopper. Therefore, in the front portion, two streams of mix meet almost head-on and travel frontwardly and downwardly together. As the feed reaches the lower part of the hopper the cycle is repeated. Since the front portion 23 is large, and does not have a mixing or turbulence-causing member therein, a smooth flow of intermixing is accomplished in this area.

Of course, by the very dimensions of the hopper and the loose operation of the conveyors, some of the mixed material will fall toward rounded bottom 22. Along the rounded bottom 22 the blades 52 and 52' will urge such material toward the conveyor 40 and that material which seeps by conveyor 34 is again urged to the main stream of travel.

After the desired length of time mixing has been accomplished the opening 32 may be opened and the mixed material may be dispensed through spout 60.

It can be seen that there has been disclosed, a mixing mill which is of a type that will insure thorough mixing by constantly urging the feed together in a meeting (front portion) of a hopper. The operation is efficient over a wide range of mixes because even the lightest of feeds will act by gravity and be forced together and downwardly within the mixing mill.

In a general manner, while there has been disclosed in the above description, what is deemed to be the most practical and efficient embodiments of the invention, it should be well understood that the invention is not limited to such embodiments as there might be changes made in the arrangement, disposition and form of the parts without departing from the principle of the present invention as comprehended within the scope of the accompanying claims.

I claim:

1. A feed mixer comprising in combination, a hopper housing having a rounded bottom, sloping side walls and a pair of vertical end walls defining a mixing chamber having a front portion and a rear portion, a vertical conveyor extending through said rear portion and having an extension through said bottom, a housing for said extension in communication with the interior of said hopper, one of said end walls having a feed inlet opening substantially midway of the vertical length of said end wall, a first horizontal conveyor in said hopper extending through said opening, a second horizontal conveyor along said bottom, a third horizontal conveyor in said hopper spaced above said first and second horizontal conveyors, said first and second horizontal conveyors being in said front portion of said chamber and said third horizontal conveyor being in said rear portion.

2. A feed mixer comprising in combination, a hopper housing having a rounded bottom, sloping side walls and a pair of vertical end walls defining a mixing chamber having a front portion and a rear portion, a vertical conveyor extending through said rear portion, one of said side walls having a feed inlet opening spaced a substantial distance from said bottom, a horizontal feed conveyor in said hopper extending through said opening, a horizontal lower conveyor below said feed conveyor and along said bottom, an upper horizontal conveyor in said hopper spaced above said first and second horizontal conveyors, said feed and lower horizontal conveyors being on one side of said vertical conveyor and said upper conveyor being on the other side thereof.

3. The feed mixer defined in claim 2 wherein said upper, lower and feed conveyors have parallel shafts.

4. A feed mixer comprising in combination, a hopper housing having a front portion and a rear portion, a vertical conveyor extending through said rear portion, one of said side walls having a feed inlet opening spaced midway of the depth of said housing, a first horizontal conveyor in said hopper extending through said opening to the other of said end walls, a second horizontal conveyor below the first conveyor and having means to remove the material being mixed from the bottom of said housing, a third horizontal conveyor in said hopper spaced above said first and second horizontal conveyors and in said rear portion, said first, second and third horizontal conveyors having means thereon to force the materials being mixed toward said vertical conveyor.

References Cited in the file of this patent

UNITED STATES PATENTS

| | | |
|---|---|---|
| 185,754 | Joseph | Dec. 26, 1876 |
| 1,177,666 | Wayling et al. | Apr. 4, 1916 |
| 1,880,626 | Wilmoth | Oct. 4, 1932 |
| 2,621,904 | Stauffer | Dec. 16, 1952 |
| 2,894,733 | Wosmek | July 14, 1959 |
| 2,895,721 | Jacobson et al. | July 21, 1959 |
| 2,947,524 | Bridges | Aug. 2, 1960 |